H. E. CURTIS.
CALIPERS.
APPLICATION FILED JUNE 12, 1915.
1,281,526.
Patented Oct. 15, 1918.
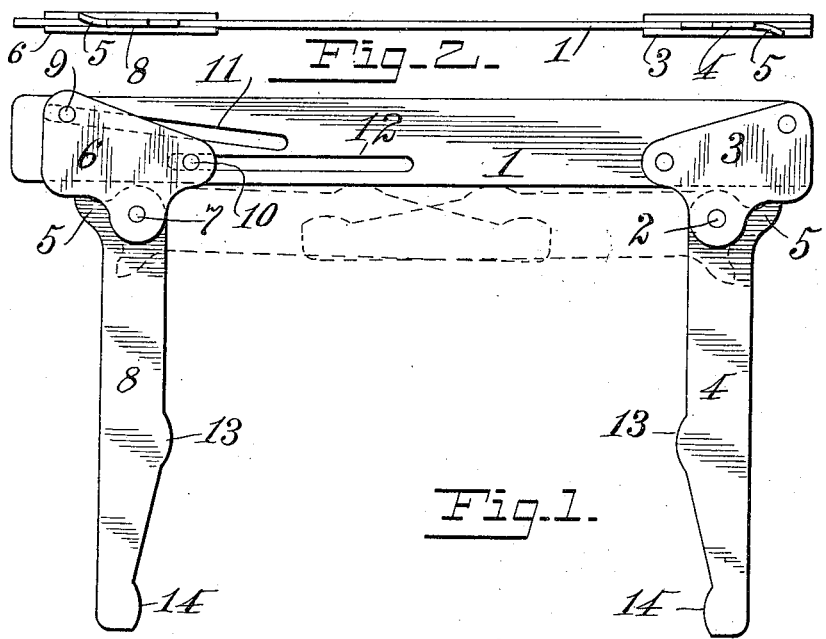
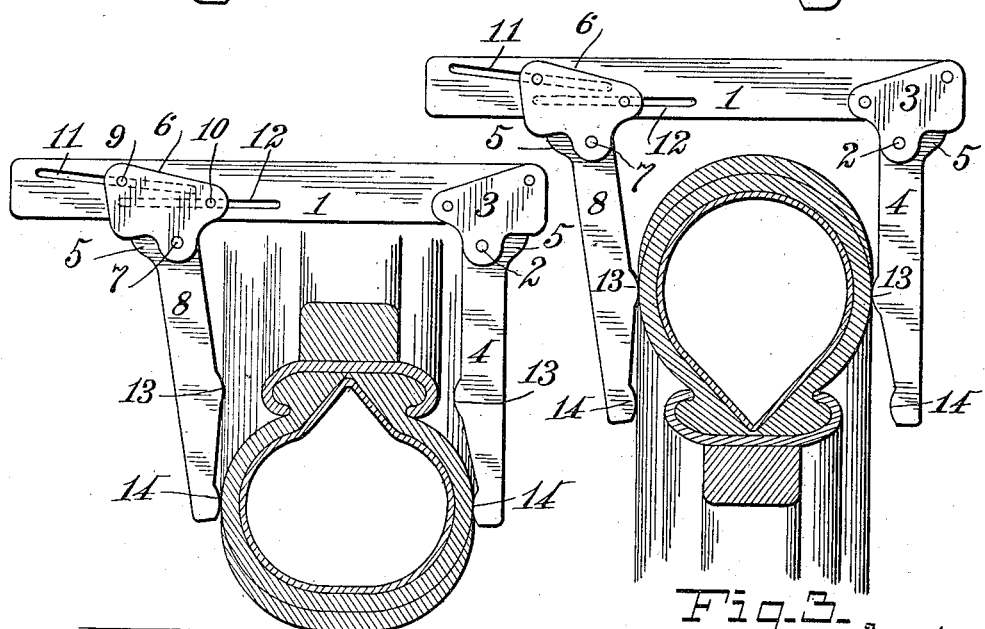

UNITED STATES PATENT OFFICE.

HENRY E. CURTIS, OF DAYTON, OHIO, ASSIGNOR TO THE B. F. GOODRICH COMPANY, A CORPORATION OF NEW YORK.

CALIPERS.

1,281,526.  Specification of Letters Patent.  Patented Oct. 15, 1918.

Application filed June 12, 1915. Serial No. 33,652.

*To all whom it may concern:*

Be it known that I, HENRY E. CURTIS, a citizen of the United States, residing at Dayton, in the county of Montgomery and State of Ohio, have invented certain new and useful Improvements in Calipers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to calipers for comparing the normal or undistorted width of a pneumatic tire with its width adjacent to the ground where it is distorted by the weight of the vehicle and its contents, in order to determine whether or not the tire contains sufficient air pressure. Heretofore it has been proposed to make such calipers with measuring portions in the form of two scales, whose corresponding units differ by a certain percentage which represents the maximum allowable distortion, but such calipers have the disadvantage of requiring two settings for each comparison.

The object of this invention is to provide a tire calipers of the class specified, which shall enable the comparison of a normal and a distorted section of the tire to be effected with a single setting of the instrument.

Of the accompanying drawings,

Figure 1 represents a side elevation of the improved tire calipers.

Fig. 2 represents a bottom plan or edge view.

Fig. 3 represents a sectional view of a pneumatic tire showing the calipers applied to a normal tire section.

Fig. 4 represents a similar view showing the calipers applied to a distorted section adjacent to the ground.

In the drawings, 1 represents a flat bar to which is pivotally attached at 2, between a pair of plates 3 riveted on the end of the bar, an arm 4 having a projection 5 laterally bent to engage one of the plates 3 and act as a back stop for the arm in its extended or right-angle position.

6 is a slide composed of side plates having pivotally attached at 7 an arm 8 similar to the arm 4 and provided with a stop projection 5. The plates of slide 6 are connected by rivet pins 9, 10 occupying guide slots 11, 12, formed in the bar 1 and positioned in an angular relation, the slot 12 being preferably at right-angles to the arm 4. The angular relation of these slots causes the arm 8 and its slide to swing or tilt about the pin 10 as a fulcrum when slide 6 is moved along the bar 1, and thereby to change the angular relation of the two arms 4 and 8.

13 and 14 are two pairs of calipering points or projections formed upon the respective arms 4 and 8, the projections 13 being adapted to measure the normal tire section and the projections 14, which are farther apart than the projections 13, being adapted to measure the distorted section. I use the term "calipering points" in a broad sense, meaning any suitable structure locating the two imaginary lines upon which the width of the tire is measured. In practice it is desirable that these points should be projections, as shown, on one of the caliper arms at least, and it is convenient to form the projections on both arms. In any position of slide 6, the distances between these pairs of projections differ by a predetermined percentage (which in practice is about 9%) representing the maximum distortion which the tire should exhibit under load, any greater amount indicating that the tire is underinflated for the particular load. If the arms 4 and 8 were to remain parallel or in a fixed angular relation, obviously this percentage would change as the slide 6 is shifted, but the angularly-related slots 11, 12 enable this ratio to remain the same for all sizes of tires or enable it to change as may be desired for the different sizes by changing the angle or contour of the slots.

In operating the calipers, slide 6 is so placed along the bar that the projections 13 touch on the widest part of a normal section of the tire as indicated in Fig. 3, and then, without any further adjustment of said slide, the distorted section on the ground is measured between the projections 14 as indicated in Fig. 4. If the width of the distorted tire is within this measurement, it shows that the tire has sufficient air pressure for the particular load which it is sustaining at the time, or if it exceeds this measurement, then the tire should be further inflated.

The pivoting of the arms 4 and 8, while not essential, is convenient in order to permit them to be folded parallel with the bar 1 as indicated by dotted lines in Fig. 1.

I claim:

1. A pneumatic tire calipers comprising two arms each having two measuring points, each point on one arm coöperating with a corresponding one on the other to form two pairs of measuring points for comparing the normal diameter of a tire with its diameter as distorted by the load, without changing the relation of the arms, the distance apart of the measuring points in the respective pairs differing by a predetermined percentage representing the increase in the horizontal diameter under the safe allowable amount of distortion, said arms being connected at a distance from the nearest pair of measuring points sufficient to accommodate the depth of the ordinary tire, rim and felly.

2. A tire calipers comprising a pair of arms having two pairs of calipering points for measuring the normal width and the width under distortion by the load of a pneumatic tire, one of said arms being movable toward and from the other, and means for varying the angular relation of the arms in a definite manner during such movement.

3. A tire calipers comprising a bar having a pair of arms provided with two pairs of calipering points for measuring the normal width of a pneumatic tire and its width as distorted by the load, one of said arms being mounted on a slide movable toward and from the other arm, said bar being formed with a pair of angularly-related slots, and guide members on the slide occupying the respective slots.

In testimony whereof I affix my signature.

HENRY E. CURTIS.

Copies of this patent may be obtained for five cents each, by addressing the "Commissioner of Patents. Washington, D. C."